Oct. 31, 1967    V. A. BABITS    3,350,566
LASER MIXER AND IF AMPLIFIER
Filed Oct. 6, 1964
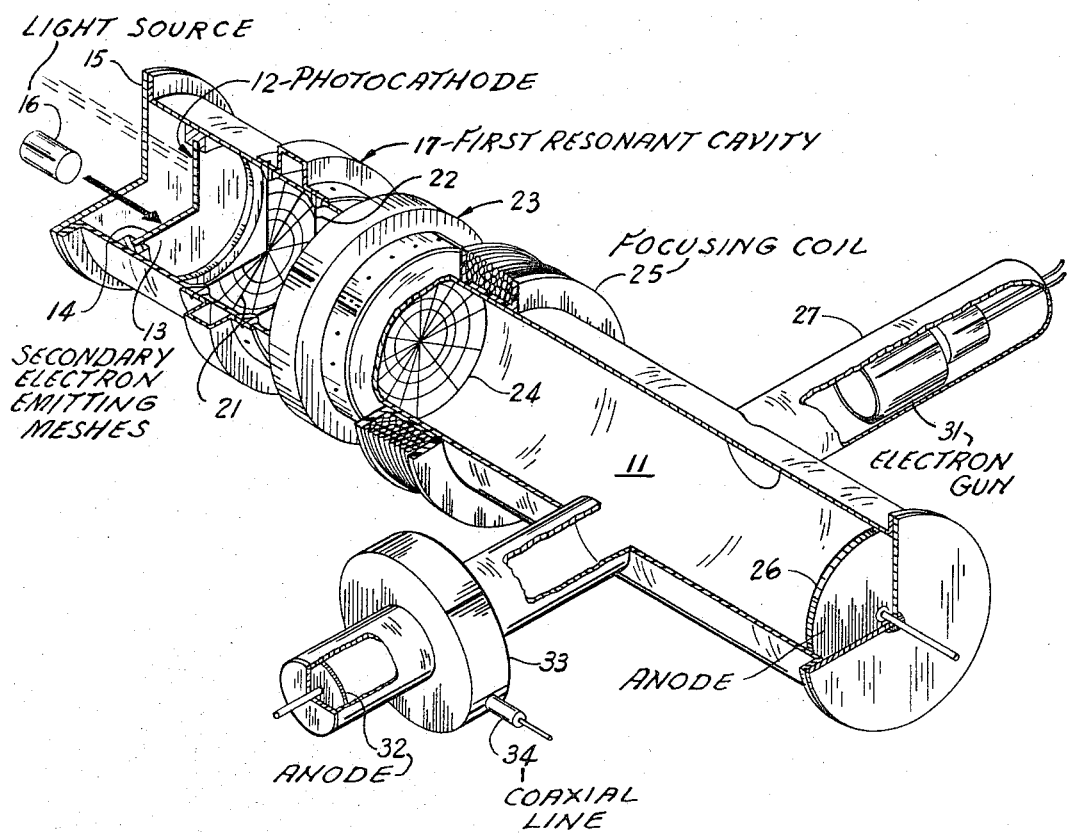
VICTOR A. BABITS
INVENTOR.
BY Carl R. Brown
ATTORNEY

3,350,566
LASER MIXER AND IF AMPLIFIER
Victor A. Babits, La Jolla, Calif., assignor to General Dynamics Corporation, San Diego, Calif., a corporation of Delaware
Filed Oct. 6, 1964, Ser. No. 401,901
4 Claims. (Cl. 250—199)

This invention relates to frequency conversion, and more particularly to a coherent light frequency converter and difference frequency amplifier.

Receivers heretofore known for monochromatic coherent light beams generated by lasers have provided poor signal-to-noise ratios. Either amplification has been low, or a great deal of noise has been added to the signal.

The present invention comprises an electronic device wherein a stream of electrons are emitted at varying velocities by a photocathode illuminated by a signal laser beam and a laser "local oscillator" beam. The electrons in the stream tend to bunch, producing a current at the difference frequency between the signal laser beam and the local beam. Pairs of secondary emission cathodes forming partitions of microwave cavities resonant at the difference frequency reinforce and amplify the bunched electron stream. A second high velocity beam of electrons is projected by an electron gun perpendicularly to, and intersecting, the first electron stream. The second beam is modulated by the bunched first stream. An output microwave cavity tuned to the difference frequency is coupled to the second beam, providing an amplified output signal at the difference frequency.

It is, therefore, an object of this invention to provide a superheterodyne laser receiver.

Another object of this invention is to provide a laser mixer and intermediate frequency amplifier having a high signal-to-noise ratio.

Another object of this invention is to provide a laser mixer and intermediate frequency amplifier wherein a first electron beam modulated with an intermediate frequency cross modulates a second electron beam.

Another object of this invention is to provide a laser mixer and intermediate frequency amplifier which provides high amplification with low noise, is efficient, and is simple and inexpensive to construct.

These and other objects and advantages of the present invention may best be appreciated by reference to the following detailed description and accompanying drawing, wherein the single figure illustrates a presently preferred embodiment of the invention.

Referring now to the drawing, the figure illustrates a T-shaped laser mixer and intermediate frequency amplifier vacuum tube 11 having a photocathode 12 at one end. Photocathode 12 comprises a photoemissive material 13 on a lime glass backing 14, which faces a lime glass optical window 15. In a presently preferred embodiment, photo-emissive material 13 comprises a silver-oxygen-cesium material responsive to wavelengths greater than 8000 A., and an antimony-potassium-sodium-cesium material responsive to wavelengths less than 8000 A.

Photocathode 12 is illuminated by a local laser coherent light source 16 and by a distant, intelligence carrying, modulated coherent light source, not shown. If the frequency of the intelligence carrying modulated coherent light beam is $f_{1s}$ and the frequency of the local laser coherent light source 16 is $f_{1o}$, then photocathode 12 emits a stream of electrons pulsed with the frequency $f_{mw}=f_{1s}-f_{1o}$.

A first resonant cavity 17 tuned to frequency $f_{mw}$ includes secondary electron emitting meshes 21 and 22 forming walls parallel to photocathode 12 and perpendicular to the pulsed electron stream. Second resonant cavity 23, also tuned to frequency $f_{mw}$, and including a first secondary electron emitting mesh 24 and a second secondary electron emitting mesh, invisible in the figure, but placed similarly to mesh 21, is spaced from the hereinabove disclosed first resonant cavity 17. A positive D.C. potential is applied to first resonant cavity 17 and its associated secondary electron emitting meshes, and a higher positive D.C. potential is applied to second resonant cavity 23 and its' associated secondary electron emitting meshes.

A focusing coil 25 focuses the pulsed electron stream to a narrow beam at the junction with cross tube 27. The electron stream impinges upon anode 26, which is maintained at a high positive D.C. potential.

Cross tube 27 includes an electron gun 31 of a type well known in the art. The high velocity stream of electrons from electron gun 31 crosses the pulsed electron stream and impinges upon anode 32, maintained at a high D.C. potential. Resonant cavity 33 is coupled to the cross electron beam, extracting the amplified energy at the difference frequency $f_{mw}$ from the electron beam. A suitable output coaxial line 34 is coupled to cavity 33.

As disclosed hereinabove, simultaneous illumination of photocathode 12 by an intelligence-modulated coherent light beam from a distant laser and by a coherent light beam from local laser 16 results in electron emission from photocathode 12 pulsed with the difference frequency $f_{mw}$ between the coherent light frequencies. As the emitted electron stream travels toward anode 26, it passes through secondary electron emitting meshes 21 and 22. The secondary emitting electrode meshes, connected to and forming part of microwave cavity 17, tuned to the difference frequency, excite the cavity to resonance. The voltage on the secondary emitting electrode meshes fluctuates at the difference frequency $f_{mw}$ the cavity is tuned to, emitting secondary electrons so as to amplify the bunched electron stream. Tuned cavity 23 and its' secondary electron emitting meshes further amplifies the bunched electron stream.

Focusing coil 25 converges the bunched electron stream, narrowing it in the area of intersection with the perpendicular electron beam from electron gun 31. The amplified bunched electron stream from photocathode 12 modulates the cross electron beam from electron gun 31. The pulsating charge bunches in the first electron stream lower the potential of the traveling space of the second electron beam in a pulsating manner in the traveling space of the second beam at the intersection of the beams. The second beam is thus modulated by the pulsating charge bunches of the first stream.

The modulated beam from electron gun 31 travels down cross tube 27 to anode 32, maintained at a high positive D.C. potential. A third resonant cavity 33, tuned to difference frequency $f_{mw}$, is coupled to the cross-modulated electron beam in cross tube 27 and excited thereby. A coaxial connector 34 coupled to resonant cavity 33 enables connection of suitable microwave signal processing apparatus, such as a conventional microwave receiver to recover the intelligence modulating the signal laser beam.

Cross modulation of the electron beam in the cross tube 27 by the bunched electron stream emitted by photocathode 12 increases gain and improves the signal-to-noise ratio. In the electron stream emitted by photocathode 12, the ratio of D.C. to A.C. components is large, which is necessary to provide high amplification. After cross modulation, the ratio becomes small in the cross beam from electron gun 31, providing a high signal-to-noise ratio.

The embodiment of this invention disclosed hereinabove is illustrative only, since many variations and modifications will occur to those skilled in the art, and it is to be understood that the scope of this invention is to be limited only by the terms of the appended claims.

What I claim is:

1. A coherent light frequency converter and difference frequency amplifier comprising, a first source of a locally generated coherent beam of light having a first frequency and a second source of an intelligence-carrying coherent beam of light having a second frequency, a first anode, photocathode means responsive to light from said first and second sources for emitting a pulsed stream of electrons at the difference frequency of said first and second frequencies toward said first anode, amplifier means for amplifying said pulsed stream of electrons, means for converging said pulsed stream of electrons, means including an electron gun and a second anode for generating a cross electron beam that intersects said converged pulsed stream of electrons, said pulsed stream of electrons modulating said cross electron beam to said difference frequency, and a resonant means responsive solely to said modulated cross beam for providing an output signal corresponding to said difference frequency.

2. A coherent light frequency converter and difference frequency amplifier as claimed in claim 1 in which, said resonant means comprises an output resonant cavity tuned to said difference frequency of said modulated cross beam.

3. A coherent light frequency converter and difference frequency amplifier as claimed in claim 2 in which, said amplifier means comprises a first resonant cavity including a first pair of secondary emitter meshes in said pulsed electrons stream at opposite sides of said first resonant cavity and parallel to said photocathode and a second resonant cavity including a second pair of secondary emitter meshes in said pulsed electron stream at opposite sides of said second resonant cavity, and said first and second resonant cavities being tuned to said difference frequency.

4. A coherent light frequency converter and difference frequency amplifier as claimed in claim 3 including, a first evacuated container means for housing said photocathode means, said first anode and said amplifier means, a second evacuated container means intersecting with and being open to said first evacuated container means for housing said electron gun and said second anode, and said output resonant cavity being positioned on said second evacuated container adjacent said second anode and external to said first evacuated container means.

References Cited

UNITED STATES PATENTS

| | | | |
|---|---|---|---|
| 2,338,237 | 1/1944 | Fremlin | 332—25 X |
| 2,496,378 | 2/1950 | Coeterier | 315—5.35 |
| 2,550,759 | 5/1951 | Bezy | 315—5.11 |
| 2,645,739 | 7/1953 | Fremlin et al. | 315—5.11 |
| 3,154,748 | 10/1964 | Javan et al. | 250—199 X |
| 3,231,741 | 1/1966 | Siegman | 250—199 |
| 3,231,742 | 2/1966 | Siegman | 250—199 |
| 3,237,011 | 2/1966 | Sterzer | 250—199 |

FOREIGN PATENTS 625,901  7/1949  Great Britain.

JOHN W. CALDWELL, *Primary Examiner.*